United States Patent [19]

Choquette et al.

[11] Patent Number: 5,798,191
[45] Date of Patent: Aug. 25, 1998

[54] POLYMER ELECTROLYTE LITHIUM BATTERY CONTAINING A POTASSIUM SALT

[75] Inventors: Yves Choquette, Ste-Julie, Canada; Michel Armand, St-Martin d'Uriage, France; Martin Simoneau, Montréal, Canada; René Gagnon, Boucherville, Canada; André Belanger, Ste-Julie, Canada

[73] Assignee: Hydro-Quebec, Montreal, Canada

[21] Appl. No.: 815,604

[22] Filed: Mar. 12, 1997

[51] Int. Cl.⁶ .................................................. H01M 10/40
[52] U.S. Cl. ........................................... 429/192; 429/218
[58] Field of Search ............................ 429/192, 218, 429/191, 188, 198; 252/62.2; 204/421

[56] References Cited

U.S. PATENT DOCUMENTS

| | | |
|---|---|---|
| 4,060,673 | 11/1977 | Dey .................................... 429/192 |
| 4,556,614 | 12/1985 | Mehautz et al. ................ 429/192 X |
| 4,668,594 | 5/1987 | Yamaura et al. . |
| 4,965,151 | 10/1990 | Takada et al. . |
| 5,013,620 | 5/1991 | Miyazaki et al. . |
| 5,114,809 | 5/1992 | Nakacho et al. . |
| 5,114,811 | 5/1992 | Ebel et al. . |
| 5,147,737 | 9/1992 | Post et al. . |
| 5,350,646 | 9/1994 | Armand et al. . |

FOREIGN PATENT DOCUMENTS

| | | |
|---|---|---|
| 2 616 013 | 12/1988 | France . |
| WO 91/02383 | 2/1991 | WIPO . |

*Primary Examiner*—Anthony Skapars
*Attorney, Agent, or Firm*—Oblon, Spivak, McClelland, Maier & Neustadt, P.C.

[57] ABSTRACT

In a rechargeable lithium battery including inter alia a lithium anode, a lithium ion reducible cathode bonded with a polymer, as well as a polymer electrolyte, potassium ions are introduced either in the cathode or in the electrolyte, or in both of them at the same time, so that potassium is distributed in the cathode and the electrolyte when the generator has reached equilibrium. This has the effect of stabilizing the performances of the battery during cycling in terms of energy and power.

15 Claims, 11 Drawing Sheets

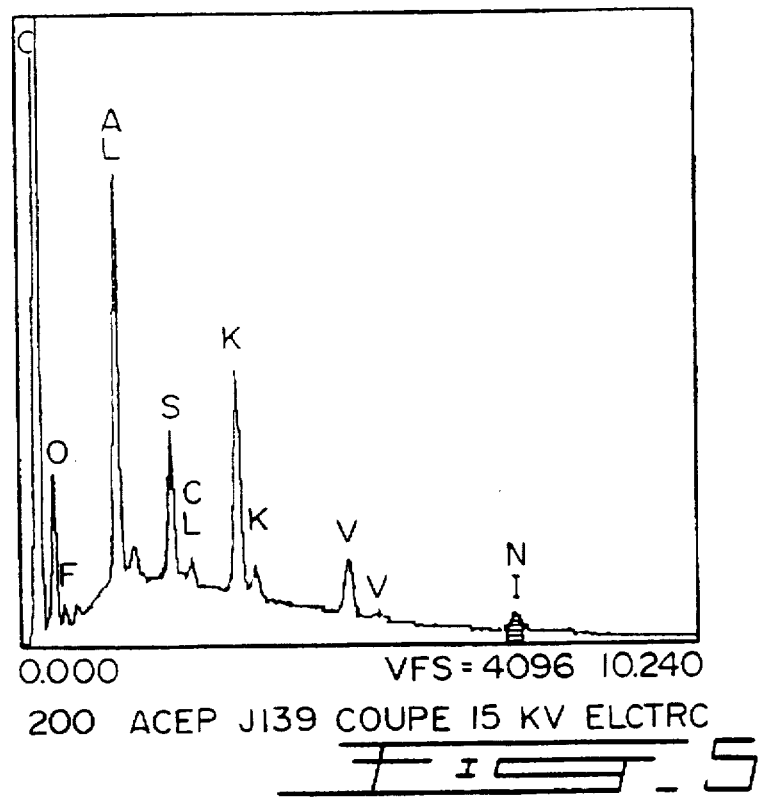
200 ACEP J139 COUPE 15 KV ELCTRC
FIG_5
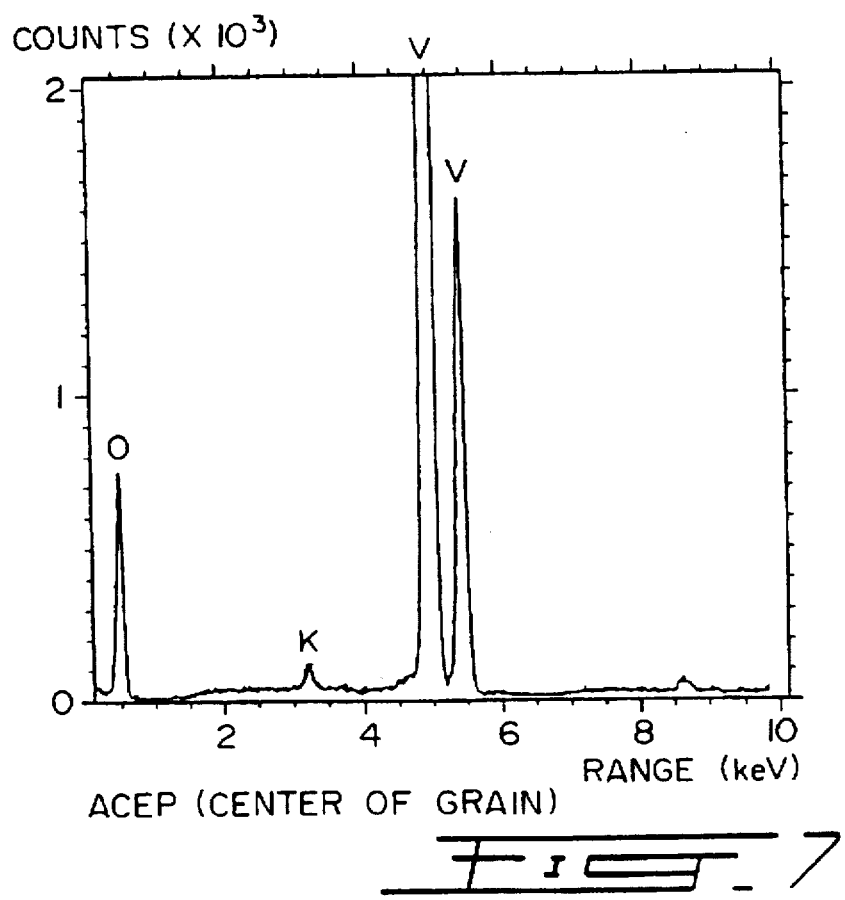
ACEP (CENTER OF GRAIN)
FIG_7

Li⁺/Li° BATTERY 6 (39 CYCLES)
O/M = 30, Li/K = 2
$R_a$ = 1.8 μm ($\Delta_{max}$ = ± 6 μm)

Li⁺/Li° BATTERY 7 (24 CYCLES)
O/M = 30
$R_a$ = 4.5 μm ($\Delta_{max}$ = ± 20 μm)

Li°/Li° BATTERY 6 (39 CYCLES)
O/M = 20, Li/K = 2
$R_a$ = 1.8 μm ($A_{max}$ = ± 6 μm)

Li°/Li° BATTERY 7 (24 CYCLES)
O/M = 30
$R_a$ = 4.5 μm ($A_{max}$ = ± 30 μm)

BATTERY 1
O/M = 30/1
Li/K = 0.8

BATTERY 3
O/M = 30/1
Li/K = 7

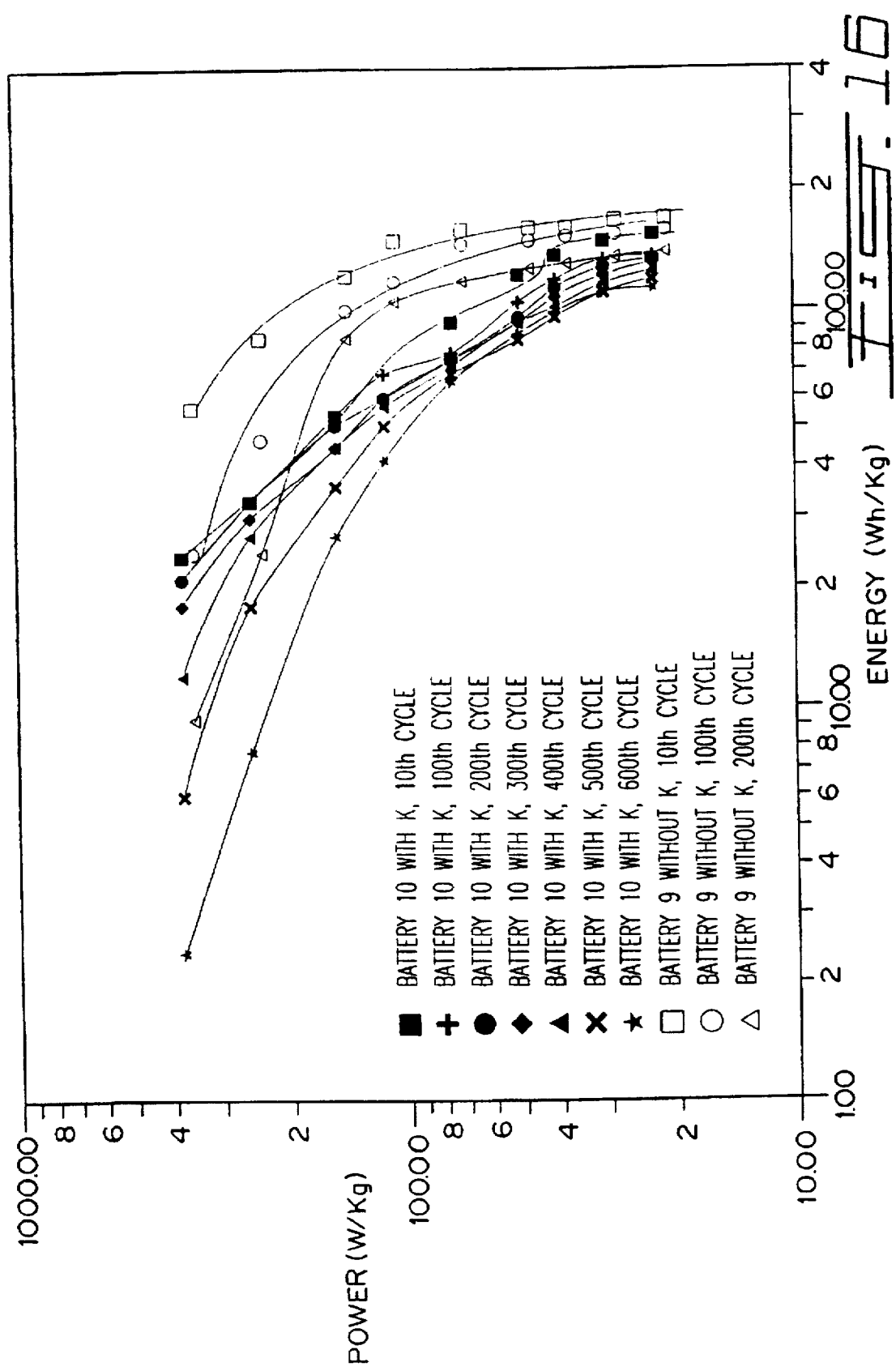

POLYMER ELECTROLYTE LITHIUM BATTERY CONTAINING A POTASSIUM SALT

BACKGROUND OF INVENTION a) Field of the Invention

The present invention concerns polymer electrolyte batteries, for example, polymer electrolyte generators having a potassium salt enabling to stabilize the performances and service life of the battery. More specifically, the invention relates to rechargeable lithium generators containing a potassium salt which is distributed in the cathode, in the polymer electrolyte, or both of these at the same time. In particular, the present invention is directed to rechargeable electrochemical generators in which the potassium ions introduced in the form of additives in the cathodes as well as in the polymer electrolyte define an in situ treatment which lasts the entire service life of the generator so as to improve performances during cycling, for example, in terms of energy and power. The present invention also concerns potassium base additives distributed in at least one, and even two, of the components of a rechargeable lithium electrochemical generator, preferably the polymer electrolyte and the composite cathode bound to a polymer, in which the effect is to stabilize the energy and power performances during cycling.

The invention also describes preferred means for introducing potassium into the generator by either one of its components and describes how the potassium is distributed in more than one component so as to optimize the operation of the electrodes during cycling. The additive has the beneficial effect of maintaining the morphology of the lithium anode during cycling and to optimize the physical properties of the cathode during cycling.

b) Description of Prior Art

The life of a battery is dependent on many factors including the reversibility of the electrochemical processes at both electrodes. The addition of alkali earth or transition metals to the active material of the cathodes of lithium batteries is known and is used generally to stabilize or optimize the insertion cathodes (FR 2,616,013; U.S. Pat. No. 5,013,620; U.S. Pat. No. 5,114,809; FR 2,573,250). The additives used are generally intended to stabilize the insertion structures and sometimes to optimize the number of sites available in the host structure (WO 91/02383; U.S. Pat. No. 4,668,594). In some cases, the additives are also intended to increase the electronic conductivity of the insertion materials (U.S. Pat. No. 4,965,151; JP 89/15317; JP 89/67063; U.S. Pat. No. 5,114,811; U.S. Pat. No. 5,147,737). In most of the cases known, the addition metals are integrated in the host structure and are present at relatively high rates which vary between 1% and 50% with respect to the main transition metal. These additives are generally immobilized in the host insertion structure and are not diffused in the other components of the generator, for example, the electrolyte and the anode. In the case where the addition metals would be soluble in the electrolyte, they would be reduced with metallic lithium and could not remain in equilibrium in the generator. Moreover, in Applicant's view, no example of additive which is present in more than one component of a lithium generator has been described up to now.

As a matter of fact, a few of these metals are chemically compatible with a lithium anode and are capable of coexisting with the lithium salts which are in solution in the electrolyte of the generator. Potassium, with magnesium is one of the only metals which are not reduced (thermodynamically and kinetically) by lithium in aprotic media and therefore constitutes a unique material to carry out the present invention.

The utilization of polymer electrolytes with mixed alkali cation has been mentioned during conductivity measurements (ACFAS 1993) and for the constitution of vehicular conduction electrolytes (cf. U.S. Pat. No. 5,350,646). None of these cases mention an equilibrium between the mixed cations of the electrolyte and the materials of the electrode or a beneficial effect on the cycling of the generator or on the lithium anode.

It is an object of the present invention to provide for a beneficial effect noted on the stabilization of the material of the cathode $V_2O_5$ which is presently used in the technology of polymer electrolyte batteries and simultaneously to provide an improvement to the reversibility of the dissolution-redeposition of the lithium anode and its morphology in order to improve the performances and service life of the battery.

SUMMARY OF INVENTION

It is therefore an object of the invention to provide improvements by the introduction of a potassium salt, such as KTFSI (potassium trifluoromethanesulfonyl imide) in the polymer separator and/or in the polymer which constitutes the composite positive or cathode.

It is another object of the invention to introduce potassium ions in the polymer, which are subsequently present in the electrodes by electrochemical means.

It is also an object of the invention to provide for the manufacture of a battery characterized by an improved cycling with respect to energy and power obtained by in situ addition of a stabilizing agent, such as potassium, without necessarily utilizing a chemical means.

It is another object of the invention to permit the introduction of a stabilizing agent, such as in the polymer electrolyte separator and/or in the cathode, so that it is uniformly distributed in the entire battery from the interface Li to the collector of the positive.

It is also an object of the invention to produce depolarizing effects during recharge (decrease of voltage of more than 20 mV in the case of dendrite formation, contact of the anode with the cathode) following the morphological development of lithium (modification of a plane surface of lithium into a rugged surface), which enables the battery to cycle again in a reversible manner for many tens of cycles without any appearance of dendrites.

In order to achieve these objects and to overcome the disadvantages of the prior art, the invention proposes a rechargeable lithium battery including at least one lithium anode, one lithium ion reducible cathode bound with a first polymer, and a polymer electrolyte comprising a second polymer, and a lithium salt in solution in the second polymer. The lithium generator according to the invention is characterized in that it contains potassium ions, which are distributed in at least one among the cathode and the polymer electrolyte, the concentration of lithium and potassium under equilibrium in the second polymer expressed as O/(Li+K), being between about 8/1 and 40/1, with a Li/K molar ratio between about 0.2 and 15. The potassium ions are selected so as to stabilize the energy and power performances of the generator during cycling.

In general, the potassium ions are introduced by means of potassium salts. The potassium salt may be distributed in the cathode, in the electrolyte, or both in the polymer electrolyte and the cathode.

Moreover, the first and second polymers may be identical or different depending on circumstances, as this will appear to one skilled in the art.

Among the potassium salts that may be used according to the invention, $KN(R_FSO_2)_2$, $KN(FSO_2)RSO_2$, $KPF_6$, $KR_FSO_3$, where F is a perhalogenoalkyl or a perhalogenoaryl and where R is an organic radical which could be the same or different, $KBF_4$ and the like may be mentioned, it being understood that the list is not limited to these compounds. The potassium ions may be incorporated in the cathode in partially or completely reduced form.

Preferably, the cathode includes at least one compound selected from oxides, sulfides or chalcogenides of transition metals, for example, vanadium pentoxide.

The compound which constitutes the cathode may be selected among those represented by formula

in which R is a di- or tri-radical. Examples of di-radicals include for example sulfur, alkylene groups containing 2 to 10 carbon atoms, oxyalkylene groups containing 4 to 12 carbon atoms, and 1 to 4 oxygen atoms, cyclic radicals such as substituted or unsubstituted phenylene, thiadiazodi-yl and oxadiazodi-yl. An example of tri-radical includes a derivative of 1,3,5 triazine on which three sulfur atoms are substituted. n is the degree of polymerization, which is comprised between 2 and 100,000, preferably between 10 and 10,000, and X is $\geq 2$, the potassium then being present in the cathode in the form of R-S-K where R is such as defined above. A mixture of polymers comprising at least one electronically conductive polymer and a compound of the type $[-R-S_x]_n$ may also constitute the cathode. It may also be selected among those represented by formula

in which M is a transition metal, X represents a chalcogen or a halogen, and z varies between 1 and 3, potassium then being present in the cathode in the form of KX, where X is such as defined above.

The invention also concerns a lithium ion reducible cathode, for rechargeable lithium generator, bound to a polymer, potassium ions being distributed in the cathode in such quantity that the concentration of lithium and potassium in a polymer electrolyte of a generator made of cathode when the generator has reached equilibrium, expressed as O/(Li+K) varies between about 8/1 and 40/1 while the molar ratio Li/K is between about 0.2 and 5.

The invention also concerns a polymer electrolyte for a rechargeable lithium battery, potassium ions being distributed in the electrolyte in such quantity that the concentration of lithium and potassium in the polymer electrolyte of a generator including the latter when the generator has reached equilibrium, expressed in O/(Li+K) varies between about 8/1 and 40/1 while the molar ratio Li/K is between about 0.1 and 5.

The amount of potassium salt, such as KTFSI with respect to the lithium salt currently used in a polymer electrolyte generator, varies to a large extent and is preferably within a K/Li ratio lower than 5, preferably between 0.2 and 1.

When the cathode contains $V_2O_5$, the maximum concentrations of $K_\alpha V_2O5$, are preferably those where $\alpha \leq 0.06$ or still where K/V is lower than or equal to 0.03.

BRIEF DESCRIPTION OF DRAWINGS

Other characteristics and advantages of the present invention will appear from the annexed drawings in which:

FIG. 5 represents a chemical analysis by EDX of the electrolyte of the same battery as the one illustrated in FIGS. 3 and 4 before cycling, demonstrating a higher concentration of potassium salt (ratio K/S) than after cycling (FIG. 3);

FIG. 7 represents a micrographic analysis by transmission electronic microscopy according to the corresponding EDX spectrum obtained at the heart of a grain of vanadium oxide establishing the presence of potassium.

FIG. 16 illustrates curves comparing the physical properties of batteries 9 and 10 without and with K with respect to the power sustained therein.

DESCRIPTION OF PREFERRED EMBODIMENT

Figure 1:
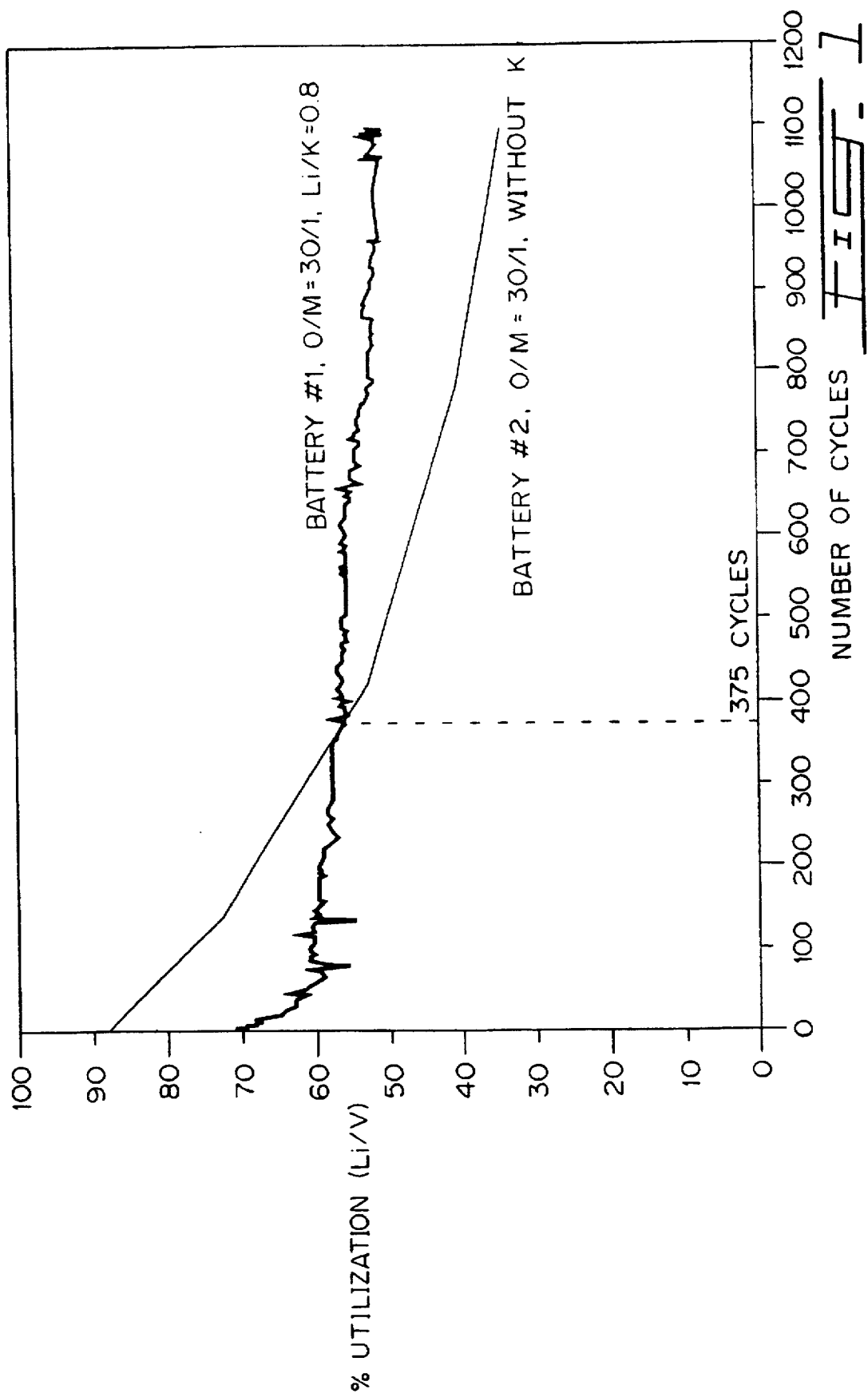
FIG. 1 is a graph representing comparative results of a battery according to the invention with potassium ions and another battery of the prior art without potassium.

The addition of potassium, for example, in the form of $KN(CF_3SO_2)_2$ in the electrolyte enables to maintain a rate of use of the active material of the cathode higher than what has been obtained in the case of a similar generator containing no potassium. It is also shown by means of elementary analysis after cycling that potassium which is introduced through the electrolyte is equally distributed in all the components of the battery without however being deposited at the anode which confirms the stability of the electrolytes with mixed alkali cations ($Li^+ + K^+$) used in the generators of the invention.

Another benefit of the present invention concerns the quality of the contact between metallic lithium and the polymer electrolyte which is maintained during discharge/charge cyclings which largely contributes to excellent properties of cycling and power of the generators according to the invention.

The possibility of introducing potassium in equilibrium in more than one component of the generator by means of the material of the cathode is also within the spirit of the invention. In these cases, the addition of potassium may be carried out by chemically pre-inserting potassium in the structure of vanadium oxide by means of a solution of an oxidizable salt such as KI in an aprotic solvent such as acetonitrile so as to give $K_xV_2O_5$ and iodine (or triiodide). It will also be shown by elementary analysis that in these cases potassium is also present in the electrolyte of the separator after cycling and analysis of the battery.

EXAMPLES

The examples which follow are given only as illustration and without limiting the scope of the invention.

Example 1

In this example a comparison is made of the results obtained during cycling (FIG. 1) of a battery having $K^+$ incorporated in situ in the polymeric separator film (battery 1) with a battery having no $K^+$ but only $Li^+$ (battery 2). $K^+$ is introduced into the battery in the form of a salt of K designated bis-trifluoromethane sulfoneimide (KTFSI) completely compatible with a polymer electrolyte battery having a lithium metal anode. Batteries 1 and 2 are made of a lithium anode 35 um thick supported on a thin sheet of nickel and a composite cathode of a composition by volume of about 40% vanadium oxide, 10% acetylene black and 50% of an ethylene oxide copolymer. This copolymer includes about 80% ethylene oxide as described in the following patents: EPO 0,013,199; U.S. Pat. No. 4,578,326; and U.S. Pat. No. 4,758,483, to which there is added the electrolyte bistrifluoromethane sulfoneimide of lithium (LiTFSI) and/or of potassium (KTFSI) in an oxygen:ionic metal ratio O/M of 30/1. The cathode of a true capacity near $4C/cm^2$ (2 Li/V) is placed on a thin nickel collector. The thickness of the separator or of the polymer electrolyte is 30 μm and the latter is also made of an ethylene oxide base polymer. The ratio Li/K is equal to 0.8 in the case of battery 1. The batteries with useful surface of 3.89 $cm^2$ are assembled by hot pressing at 80° C.

The batteries are cycled at an imposed current density of the order of 100 μA/$cm^2$ in discharge and 50 μA/$cm^2$ in charge at 60° C. between limits of 3.3 V and 1.5 V, thus enabling to produce deep discharges (100% DOD). FIG. 1 illustrates the evolution of the cycled capacity, or more specifically, the percent of utilization (cycle capacity at cycle n over the capacity obtained at cycle 1) as a function of the number of cycles. The initial rate of utilization of battery 1 is smaller than battery 2. On the other hand, the decrease of the capacity of battery 1 is stabilized after about 100 cycles at a much lower rate (6 to 7 times) than battery 2. The stabilization effect due to the presence of K in the battery is therefore perceived beyond 100 cycles and thus permits an expectation of service life of more than 1000 cycles for the generator. This stabilization becomes very interesting particularly towards 375 cycles where there is a crossing of the two curves of the loss of capacity as a function of the number of cycles.

Example 2

Figure 2:
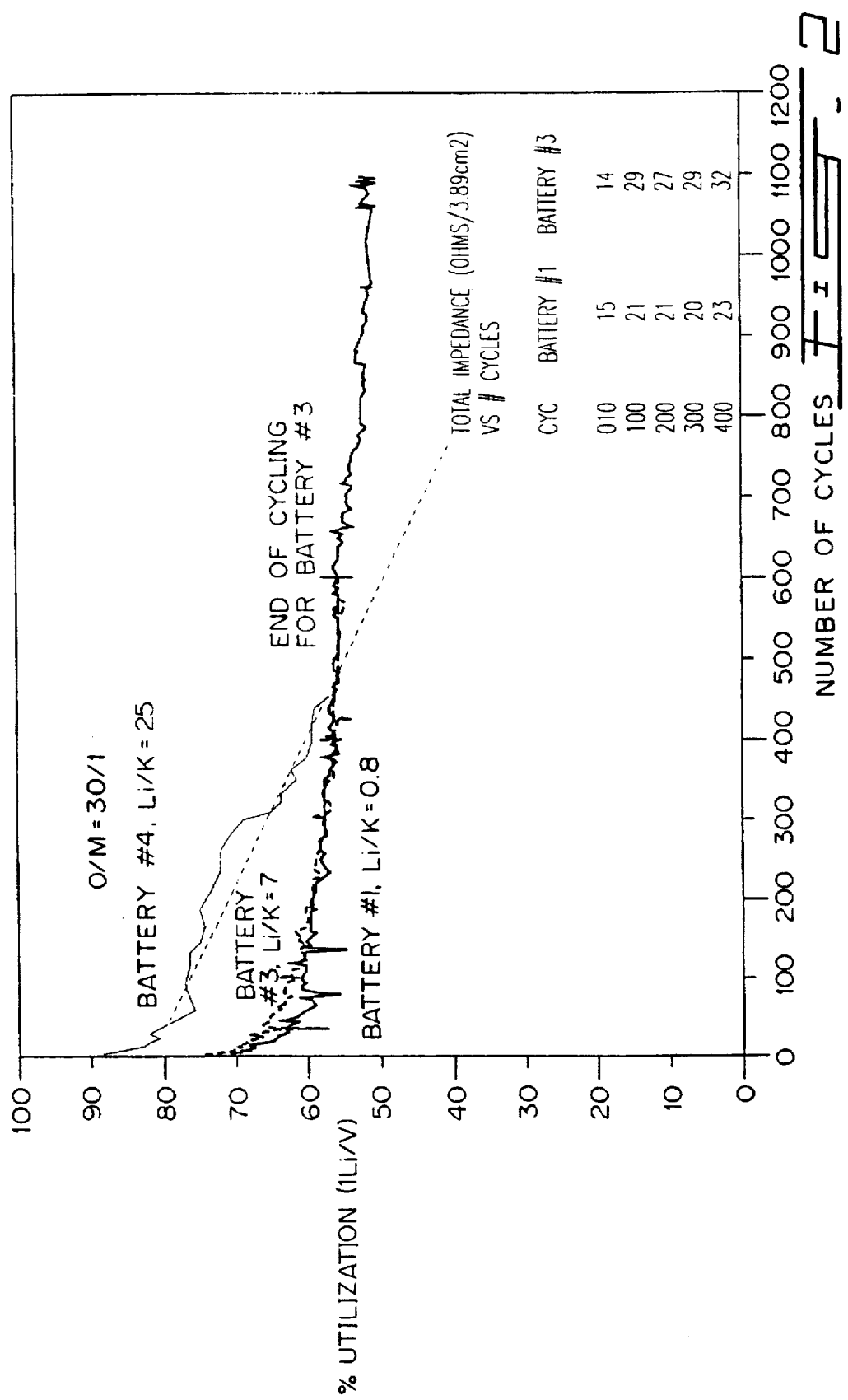
FIG. 2 is a graph comparing the performances of three generators according to the invention whose composition in Li/K is variable.

In this Example a comparison is made between the performances of three generators in which the Li/K composition varies. KTFSI is introduced into the polymer electrolyte of the separator. The batteries are essentially composed of the same anode and cathode as in Example 1. The method of assembly is also identical as well as the current densities imposed in discharge and in charge under the same limits of voltage. All the batteries are composed of a total quantity of salt O/M=30/1. The Li/K ratio in the generator is equal to 0.8 in the case of battery 1, 7 for battery 3 and 25 for battery 4. FIG. 2 shows the evolution of the percentage of utilization of these three batteries as a fuiction of the number of cycles. The evolution of battery 3 in terms of cycling and internal resistance is the same as battery 1. Indeed, for this type of electrode material a stabilization of the slope of decrease is also noted after 100 cycles and is completely similar to that of battery 1 when the internal resistance is stabilized between the 100th and 350th cycle for each battery, the internal resistance of battery 3 being slightly superior. The slope of decrease of battery 4 is much higher (about 4 times) than that of battery 3 or battery 1 and of the same order of importance as battery 2. The concentration of K in the generator is therefore too low to have a beneficial effect as a stabilizing additive. This result enables to conclude that a ratio which is lower than or equal to 25 in Li/K, but higher than or equal to 7 in Li/K, is sufficient to stabilize the loss of capacity during cycling of the generator. The maximum concentration in K may be Li/K=0.2 with a O/M=8 to respect the electrochemical compatibility of the generator with its lithium anode.

Example 3

In this Example the intention is to illustrate that the potassium additive is dispersed in a homogeneous manner in the entire generator, whether it be introduced into the separator electrolyte and/or in the cathode. The present Example (battery 5) illustrates the case where KTFSI is introduced into the separator. The quantity of salt O/M is equal to 40/1 while the ratio Li/K in the generator is equal to 0.8. The thickness of the separator is 40 microns while the other components of the generator are identical to battery 1. After 200 cycles this battery was examined by X-ray fluorescence (EDX) following a cryogenic fracture enabling to have a cross-section view of the battery.

Figure 3:
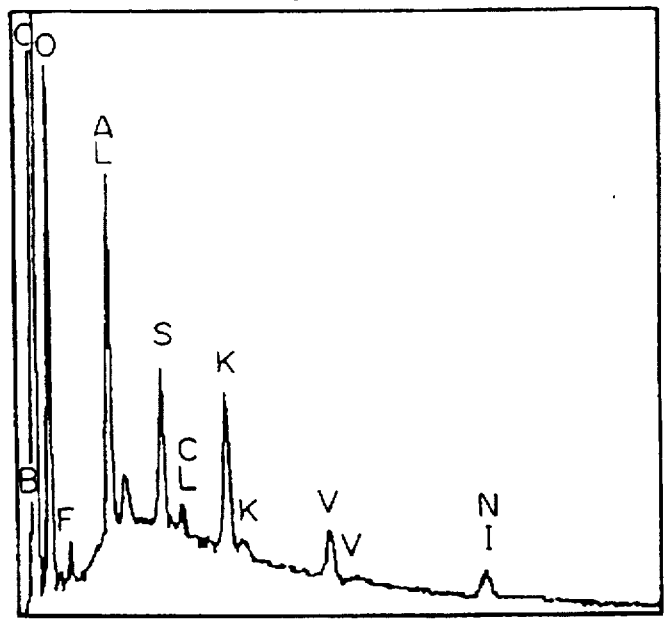
FIG. 3 represents a chemical analysis by (X-ray fluorescence) EDX of the electrolyte in cryogenic cross-section for a battery O/M=40; Li/K-0.8, after 200 cycles.
Figure 4:
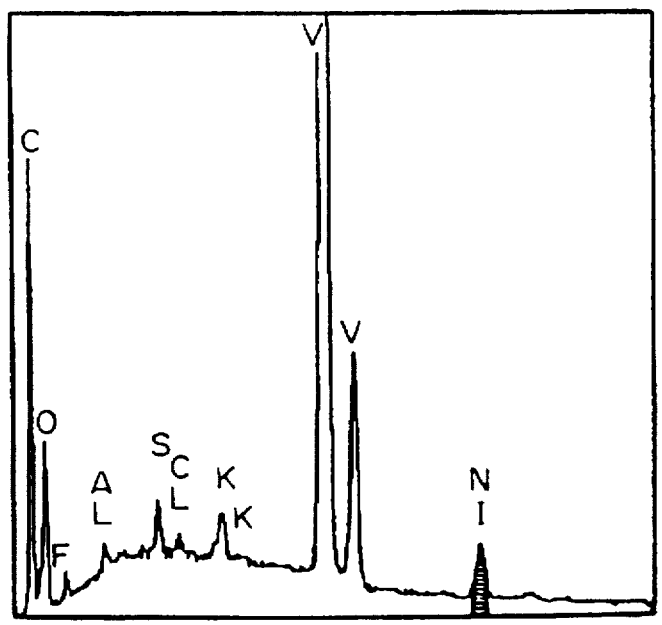
FIG. 4 represents the same analysis as FIG. 3, except that it is concerned with the positive electrode.

The relative composition in "$K^+$" in the separator electrolyte and in the positive electrode is identical, as demonstrated in FIGS. 3 and 4 by the ratios of the intensities of the peaks representing K and S. The source of S in the generator comes from the anion TFSI of the salts of Li and K. It was also noted that the ratio K/S was higher in the electrolyte before cycling (FIG. 5), which clearly demonstrates that $K^+$ is redistributed in the entire generator and that there is an equilibrium in the generator for at least two components.

Figure 6:
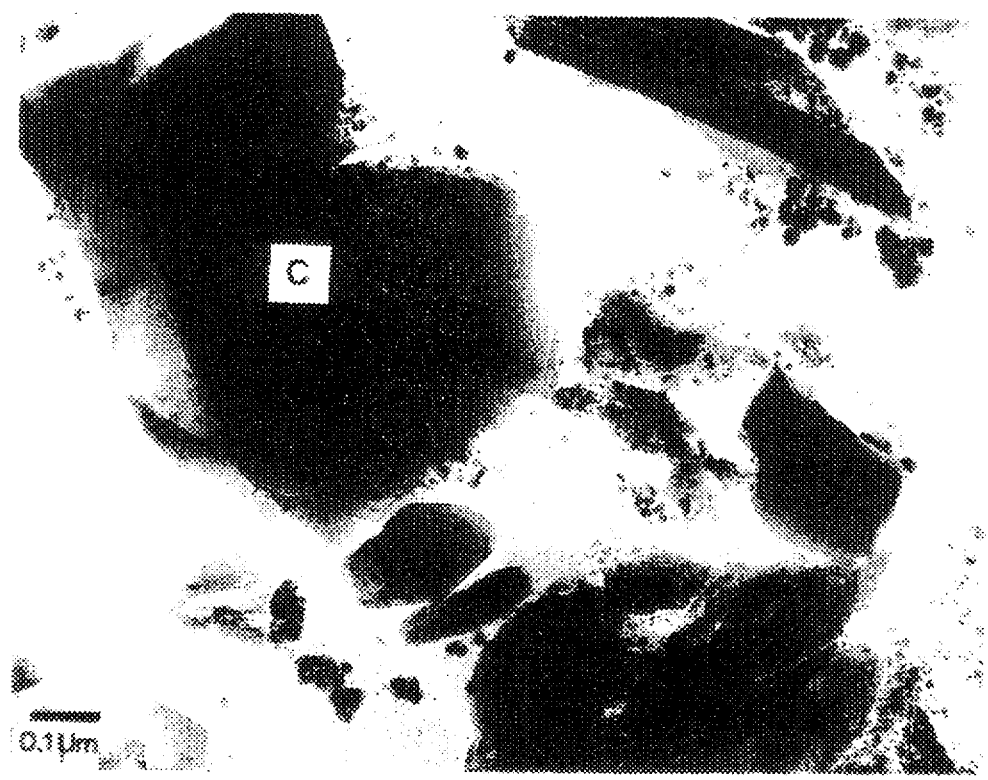
FIG. 6 is a micrograph obtained by microscopic electronic transmission (MET) which verifies the presence of potassium in the structure of vanadium oxide.

The presence of K in the structure of vanadium oxide (FIG. 6) was also verified by transmission electronic microscopy (TEM) also clarifying without any doubt the presence of K (under equilibrium) at the cathode with respect to the solid particles and the polymer electrolyte acting as binder. On the other hand, the quantity of K which is introduced into the structure is low with respect to the concentration in the binder (FIG. 7) and therefore does not disturb, as a function of the utilization of the generator, the equilibrium between $K^+$ and $Li^+$ in the polymer electrolyte.

Figure 8:
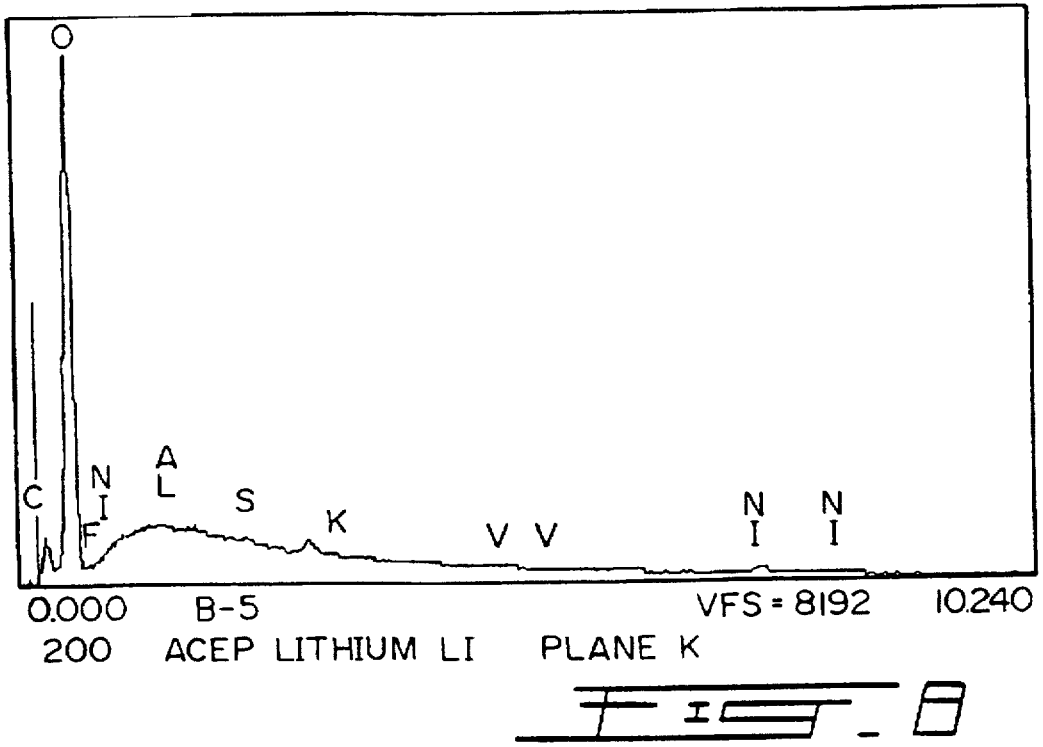
FIG. 8 represents a chemical analysis by EDX of the surface of lithium in contact with the electrolyte at the interface Li°/polymer electrolyte.

This equilibrium probably exists at the level of the interface Li/polymer electrolyte. As a matter of fact, FIG. 8 clearly shows the absence of reduced potassium (K) at the surface of metallic lithium (thus confirming the apparent stability of the K ions in the presence of the lithium anode in a polymer electrolyte medium, thus justifying that $K^+$ is completely compatible with the anode). Lithium is not detected by this technique, however, oxygen (O) which covers it is clearly visible on the spectrum. It is therefore probable that K⁺ is equally in equilibrium very close to the surface of the lithium since there is no reduction of potassium on the anode.

Thus, through these analyses it is established that K is present in more than two components and/or sections of the battery: the polymer electrolyte separator, the binder of the cathode which is made of the same electrolyte as the separator, and the granular particle of the oxide of the positive electrode. The probability of finding ionic potassium at the interface Li/polymer is also not excluded.

Example 4

Figure 9:
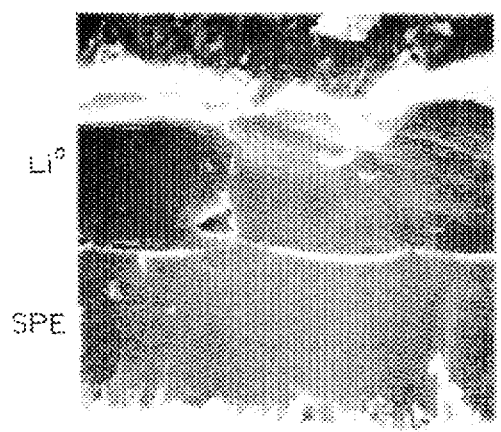
FIG. 9 is a cryogenic cross-section of a battery Li°-polymer electrolyte/polymer electrolyte-Lio with KTFSI in the electrolyte.
Figure 10:
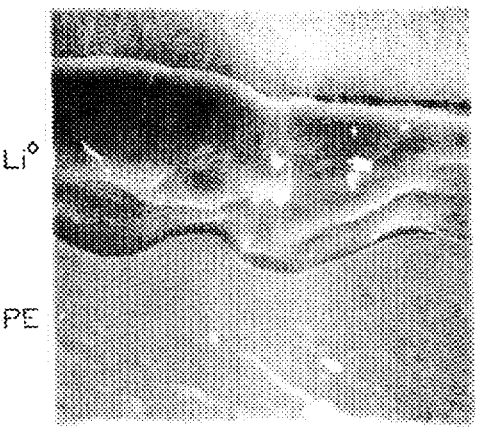
FIG. 10 is a cryogenic cross-section similar to that of FIG. 9, without KTFSI.
Figure 11:
FIGS. 11 and 12 are comparative views (75°) with a scanning electronic microscope (SEM) of the surface of lithium at the interface Li°/SPE of batteries 6 and 7 which are mentioned in FIGS. 9 and 10.
Figure 12:

In order to establish once again the beneficial effect of the presence of K⁺ at the lithium anode, two symmetrical batteries (6 and 7) having lithium anodes and cathodes have been assembled. FIGS. 9 and 10 illustrate once again a cryogenic cross-section view with a scanning electronic microscope (SEM) of these two batteries while FIGS. 11 and 12 illustrate a view of the surface. Battery 7 was assembled with metallic lithium initially 35 μm supported on a sheet of nickel 10 μm. The thickness of the electrolyte was about 30 μm. The electrolyte contained only LiTFSI at a concentration of 30/1. Battery 6 is similar to battery 7 except for two differences: It is made of Li with a thickness of 22 μm and it contains a quantity of salt O/M=20/1 at a ratio Li/K=2. Another battery (battery 8 not illustrated) was also experimented and contained a quantity salt O/M=25 at a ratio of Li/K=5. Each of these batteries was cycled at current densities and under experimental conditions similar to those described in Example 1. The anode was an electrode of lithium which is oxidized under a double current with respect to its reduction and a second electrode was used as cathode where opposite currents were noted. The times of cycling are adjusted at the same quantity of coulombs are discharged and recharged. Battery 7 has undergone 24 cycles before showing internal short-circuits while battery 6 was voluntarily stopped after 39 cycles and had not yet shown major dendrites as in the case of battery 7. The lithium noted in FIGS. 9 and 12 are those which have been cycled as anode, which means a deposition or a plating at a current density of the order of 50 μA/cm².

The developed morphology of the lithium anode of battery 7 is three times that of battery 6 even for a lower duration of cycling (nearly less than half the number of cycles). The only major difference between these two batteries is the presence of KTFSI in battery 6. Thus, these pictures establish very clearly the beneficial effect of K on the profilometry of cycled lithium and thus on the duration of the fife of the battery. The front face microscopic views are also quite revealing. Similar conclusions have been realized following an examination of battery 8 which has achieved 20 cycles.

Example 5

Figure 13:
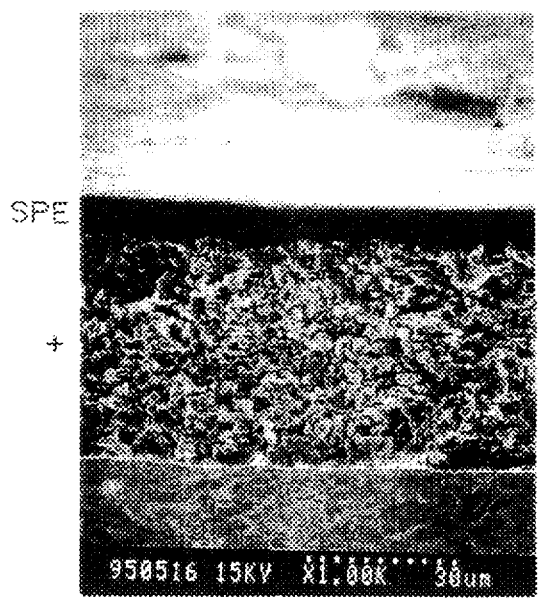
FIGS. 13 and 14 are cryogenic cross-sections of batteries 1 and 3 which are mentioned in FIGS. 1 and 2.
Figure 14:
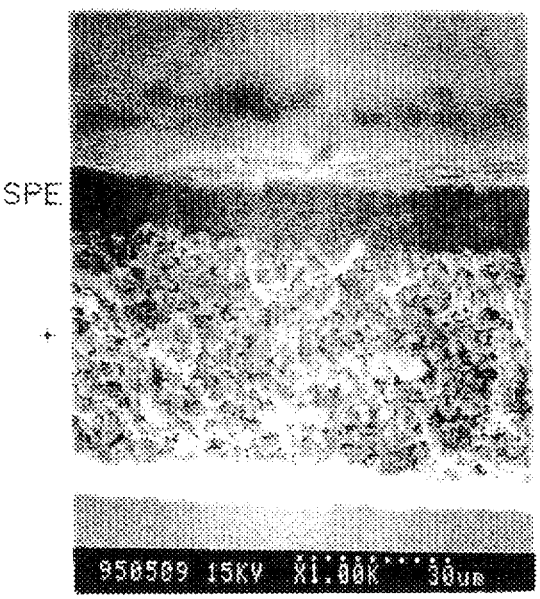

In this Example a post mortem analysis of batteries 1 and 3 was made (cryogenic cross-section view) to illustrate (FIGS. 13 and 14) the final state of the morphology of different components of the battery as seen with a scanning electronic microscope (SEM). It is noted that battery 1 achieved 1100 cycles and battery 3 near 600 cycles. As will be noted, the films of polymer electrolyte and of the cathode are still quite apart and it will be noted that the microscopic morphology of lithium is nearly nonexisting as seen from the surface of the polymer electrolyte (lithium being delaminated from the polymer electrolyte, one has to conclude that Li has a low morphologic development). As a matter of fact, previous experiments have established that a view of the surface of the polymer electrolyte at the interface of the anode represented the mirror image of the surface of lithium. The inhibiting effect of potassium anode on the development of the morphology of lithium is also demonstrated from these results.

Example 6

Figure 15:
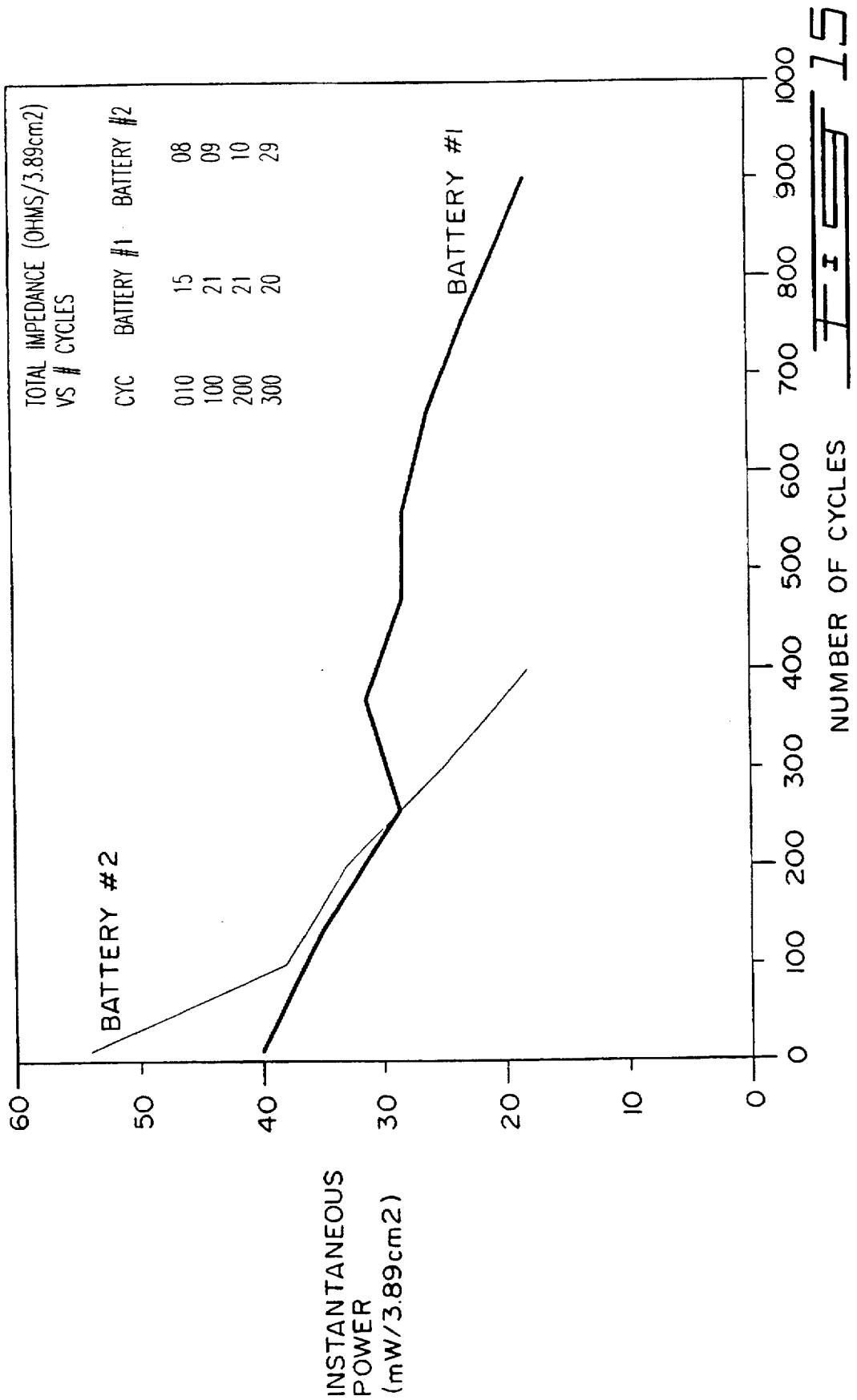
FIG. 15 illustrates the evolution of the maximum value of the instantaneous power $P_i$ as a function of cycling for batteries 1 and 2 which are mentioned in FIG. 1.

In this Example the beneficial effect of the additive K⁺ on the evolution of the instantaneous power as a function of the life of the generator is confirmed. The two batteries which were investigated are essentially the same as those of Example 1. The instantaneous power ($P_i$) is determined when the generator is fully charged. Current densities (I) of the order of 1 to 5 mA/cm² are provided on the battery for 20 seconds. Between each call for power the battery is allowed to rest for 120 seconds. The final voltage (V) of each impulsion is then registered and the instantaneous power (mW) is given by the equation Pi=VI. FIG. 15 illustrates the evolution of the maximum value of $P_i$ as a function of cycling. It can be observed that the power of battery 1 stabilized between 200 and 600 cycles, which is not the case for battery 2. Similarly during cycling, battery 2 has a higher instantaneous power during the first 200 cycles but is never stabilized. The presence of a quantity of K in the ratio Li/K=0.1 is therefore very beneficial for the stabilization of the instantaneous power. The internal resistances of the batteries are also in FIG. 15. The internal resistance of battery 1 is slightly superior to that of battery 2 for the first 100 cycles while at cycle 300 the value of the internal resistance of battery 2 is higher. This difference may be the reason for better performances in power of battery 1.

Example 7

In this Example, the physical properties of batteries with and without K with respect to their sustained power (Ragone curve for configurations of optimized batteries for metallic collectors) are compared. Battery 9 (FIG. 16) contains no K and is of the same nature as battery 2 mentioned in Example 1. Battery 10 is exactly identical to battery 3 cited in Example 2. The quantity of K is introduced into the polymerelectrolyte by means of compound KTFSI at a rate to give a concentration Li/K=7(O/M=30). The assembly and cycling of the batteries are identical to the pervious Examples.

As already mentioned, the lower power energy of battery 9 is higher than that of battery 10 since its rate of utilization (up to about 375 cycles) is higher. The initial power is also higher than the battery having K. On the other hand, after 200 cycles, battery 9 without K shows a considerably reduced specific energy (wh/kg) especially under high power of the order of 200 W/kg, which is not the case for battery 10. As a matter of fact, although it is lower at the start of the service life of the generator, the sustained power of the battery having K is maintained, and this for more than 300 cycles, which demonstrates the stabilizing effect brought about by K in the polymer electrolyte lithium battery.

Example 8

Figure 17:
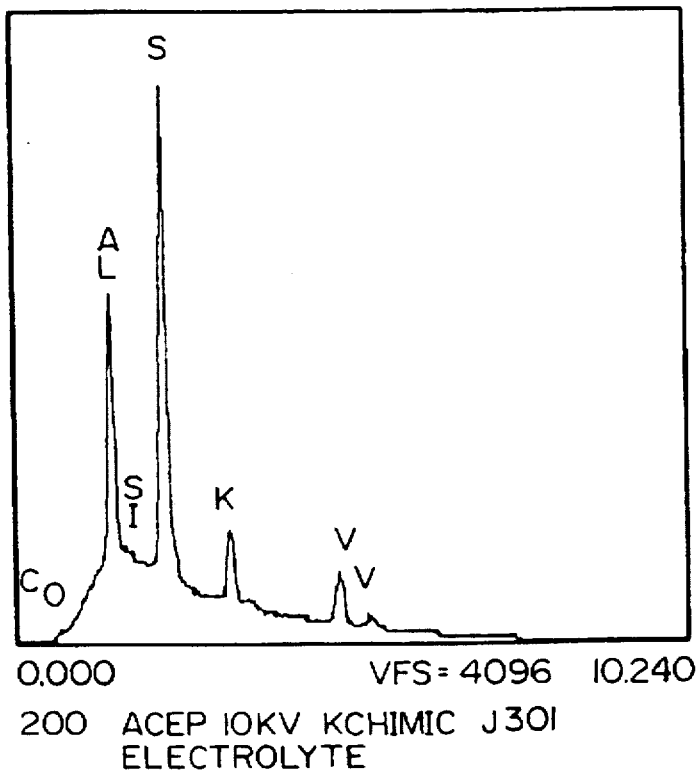
FIG. 17 is an EDX spectrum of the electrolyte of battery 11 showing the presence of K (originally inserted by chemical means in $V_2O_5$) under equilibrium between the cathode and the polymer electrolyte.

In this Example, it is shown that the equilibrium of the species Li and K may be obtained in at least three components including vanadium oxide, the polymer which binds the cathode, and the polymer of the electrolyte, due to the chemical addition of potassium in the structure of vanadium oxide by means of a solution of KI in acetonitrile so as to give $K_xV_2O_5$ and iodine (or triiodide). After a cycling of the same type as described in Example 1, battery 11 was examined by X-ray fluorescence (EDX) following a cryogenic fracture enabling to obtain a cross-section view of the battery. The electrochemical configuration of battery 11 is identical to that of battery 1 except that the electrolyte contains no salt and that vanadium oxide $V_2O_5$ contains about 0.18 mole of K. The spectrum EDX is illustrated in FIG. 17. The presence of K in the polymer electrolyte and/or the cathode may be observed while no potassium has been introduced into the starting electrolyte of the polymer binding the cathode.

It is understood that the invention is not restricted to the Examples given above, and that modifications and alternatives are possible without departing from the scope of the invention.

We claim:

1. Rechargeable lithium battery comprising at least one lithium anode, one lithium ion reducible cathode bonded to a first polymer, and a polymer electrolyte comprising a lithium salt in solution in a second polymer, said lithium battery containing an additive comprising potassium ions, said potassium ions being distributed in at least one of said cathode and said polymer electrolyte, the concentration of lithium and potassium in the second polymer when said battery has reached equilibrium, expressed as O/(Li+K), being between about 8/1 and 40/1 while the ratio Li/K is between about 0.2 to 15, said potassium ions being selected so as to stabilize performances of the battery during cycling in terms of energy and power.

2. Rechargeable lithium battery according to claim 1, wherein said potassium ions are introduced in the form of potassium salts.

3. Rechargeable lithium battery according to claim 2, wherein said potassium salt is distributed in said cathode.

4. Rechargeable lithium battery according to claim 2, wherein said potassium salt is introduced in said polymer electrolyte.

5. Rechargeable lithium battery according to claim 2, wherein said potassium salt is distributed in said polymer electrolyte and said cathode.

6. Rechargeable lithium battery according to claim 1, wherein said first and said second polymers are similar.

7. Rechargeable lithium battery according to claim 1, wherein said first and said second polymers are different.

8. Rechargeable lithium battery according to claim 2, wherein said potassium salt is selected from the group consisting of $KN(R_FSO_2)_2$, $KN(_FSO_2)RSO_2$, $KBF_4$, $KPF_6$, $KR_FSO_3$ where F is a perhalogenoalkyl or perhalogenoaryl and R is an organic radical which may be the same or different.

9. Rechargeable lithium battery according to claim 2, wherein said potassium ions are incorporated by means of said cathode, the latter being in completely or partly reduced form.

10. Rechargeable lithium battery according to claim 3, wherein said cathode includes at least one compound selected from the group consisting of oxides and chalcogenides of transition metals.

11. Rechargeable lithium battery according to claim 10, wherein said compound consists of $V_2O_5$.

12. Rechargeable lithium battery according to claim 10, wherein said compound is represented by the formula $[-R-S_x]_n$, wherein R is a di- or tri-radical, n is a whole number between 2 and 100,000, and X>2, potassium in said cathode is then in the form of R—S—K, wherein R is as defined above.

13. Rechargeable lithium battery according to claim 12, wherein said compound is represented by the formula $MX_z$ wherein M is a transition metal, X is a chalcogen or a halogen, and Z varies between 1 and 3, potassium in said cathode is then in the form of KX, wherein X is as defined above.

14. Lithium ion reducible cathode for a rechargeable lithium battery bonded to a polymer, said cathode containing potassium ions distributed therein, said potassium ions being in such an amount that the concentration of lithium and potassium in a polymer electrolyte of a generator made with said cathode when said generator has reached equilibrium, expressed as O/(Li+K), is between about 8/1 and 40/1 while the weight ratio Li/K is between about 0.2 to 15.

15. Polymer electrolyte for a rechargeable lithium battery, containing potassium ions introduced therein, said potassium ions being in such amount that the concentration of lithium and potassium in the polymer electrolyte of a generator made with said polymer electrolyte when said generator has reached equilibrium, expressed as O/(LiK), is between about 8/1 and 40/1 while the weight ratio Li/K is between about 0.5 and 5.

* * * * *